Figure 1:
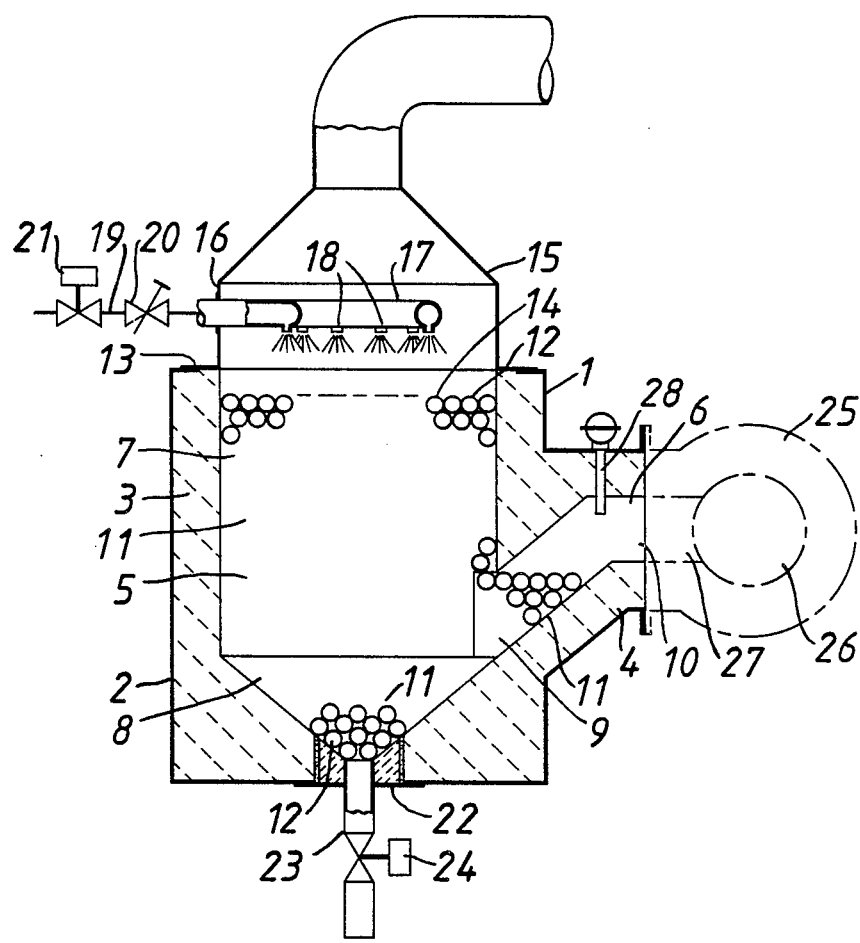

United States Patent [19]

Goodfellow

[11] Patent Number: 4,768,949
[45] Date of Patent: Sep. 6, 1988

[54] LIMITING THE PRESENCE OF THE OXIDES OF NITROGEN IN REGENERATIVE HEATING SYSTEMS

[75] Inventor: James H. Goodfellow, Dewsbury, England

[73] Assignees: British Gas plc; Hotwork Developments Ltd, both of London, England

[21] Appl. No.: 96,284

[22] Filed: Sep. 14, 1987

Related U.S. Application Data

[63] Continuation of Ser. No. 930,412, Nov. 14, 1986, abandoned.

[30] Foreign Application Priority Data

Dec. 19, 1985 [GB] United Kingdom ............... 31277
Feb. 20, 1986 [GB] United Kingdom ............... 04168

[51] Int. Cl.$^4$ ............... F27B 15/00; F23D 13/20
[52] U.S. Cl. ............... 432/214; 432/181; 432/215; 431/4; 431/190
[58] Field of Search ............... 432/179–181, 432/214, 215, 219; 431/170, 4, 190

[56] References Cited

U.S. PATENT DOCUMENTS

| | | | |
|---|---|---|---|
| 2,647,041 | 7/1953 | Robinson | 432/215 |
| 3,633,886 | 1/1972 | Froberg | 432/179 |
| 3,860,384 | 1/1975 | Vulliet et al. | 431/190 |
| 3,870,474 | 3/1975 | Houston | 432/181 |
| 4,000,962 | 1/1977 | Hemingway et al. | 432/181 |
| 4,492,558 | 1/1985 | Schwartz et al. | 431/4 |
| 4,528,012 | 7/1985 | Sturgill | 432/181 |
| 4,634,370 | 1/1987 | Chesters | 431/4 |

FOREIGN PATENT DOCUMENTS 244906 12/1925 United Kingdom .
895463 5/1962 United Kingdom .

Primary Examiner—Henry C. Yuen
Attorney, Agent, or Firm—Oblon, Fisher, Spivak, McClelland & Maier

[57] ABSTRACT

The presence of the oxides of nitrogen in the exhaust gas leaving a regenerator is limited by injecting water or water vapor into the regenerator 1 during its firing phase and causing the water or water vapor to reach the combustion chamber 26 of the regenerator 1 by way its heat storage bed 11 which has been preheated during a previous heat collecting phase.

7 Claims, 2 Drawing Sheets

LIMITING THE PRESENCE OF THE OXIDES OF NITROGEN IN REGENERATIVE HEATING SYSTEMS

This application is a continuation of application Ser. No. 930,412, filed on Nov. 14, 1986, now abandoned.

The present invention relates to the limiting of the presence of oxides of nitrogen in the exhaust gas emitted by a regenerative heating system and is also concerned with a regenerator adapted for this purpose and also adapted for the removal from the heat storage bed of the regenerator susceptible material as hereinafter defined tending to block the pores of the bed.

Regenerative heating systems usually comprise two or more regenerators which are connected to a furnace containing a charge to be heated by the combustion products supplied through the wall of the furnace by the regenerators. The system is designed so that the combustion products supplied by one regenerator during its so called firing phase provide waste heat in the form of waste gas leaving the furnace, the waste heat being recovered by another regenerator operating in a heat collecting or recovery phase.

Each regenerator usually comprises a shaft housing a heat storage bed disposed between two openings.

One opening communicates directly with the furnace to serve during a firing phase of the regenerator as an outlet to discharge combustion products to the furnace and during a heat collecting phase of the regenerator as an inlet to receive waste gas from the furnace. The other opening serves during a firing phase of the regenerator as an inlet to receive combustion air to provide combustion of the fuel in a combustion chamber and during a heat collecting phase of the regenerator as an oulet to discharge the waste gas as exhaust gas to the atmosphere.

The heat storage bed recovers heat from the waste gas during a heat collecting phase before allowing it to be discharged as exhaust gas from the system. The bed then releases its stored heat during a firing phase to preheat the combustion air as it passes through the bed before it reaches the combustion chamber. The bed itself is permeable to fluids such as waste gas and air of course and comprises a porous structure frequently of discrete particles of a heat collecting refractory material.

The combustion chamber, which lies between the heat storage bed and the opening communicating directly with the furnace serves to provide combustion of fuel with the preheated combustion air during a firing phase whereby the combustion products are produced. The fuel is injected into the chamber during the firing phase, means being provided to ignite the fuel so that combustion can take place.

The combustion chamber may form part of a burner incorporated within the regenerator forming part of a regenerative heating system. Typical such regenerative heating systems are fully described in U.S. Pat. No. 4,522,588 corresponding to published GB Patent Application No. 2128724A and in our copending UK Patent Application No. 8527894.

The preheating of combustion air in the manner described above has now become a well established technique for improving the efficiency of high temperature furnaces by recovering heat from the waste gas.

One effect of preheating combustion air is generally to raise the temperature of the flame ensuing from the fuel combustion process. This effects the combustion reaction and tends to increase the formation of the oxides of nitrogen mainly NO and $NO_2$. In fact where the fuel is natural gas, the production of these oxides increases markedly with flame temperature and is overwhelmingly caused by the thermal fixation of atmospheric nitrogen present in the combustion air. The quantity of oxides produced is also determined by the time (residence time) for which the flame is held at these high (peak) flame temperatures.

The production of the oxides of nitrogen (known as $NO_x$ for short) as a consequence of the combustion of fuel with air is undesirable in its effect upon the environment as the $NO_x$ in the exhaust gas leaving the regenerative heating system is now known to produce air pollution contributing to acidification of rain, the production of photochemical oxidants in the interaction of the $NO_x$ with the hydrocarbons in the atmosphere and the degradation of visibility where high levels of $NO_2$ are allowed to be emitted.

Legislation already exists in some countries e.g. Japan, to limit the presence of $NO_x$ in emitted exhaust gas and it is quite likely that similar legislation will be introduced in Europe and possibly North America and it will be essential to limit $NO_x$ emission if the more efficient heat recovery systems of the regenerative type are to be widely adopted.

A known method of reducing the level of $NO_x$ produced by a burner is the provision of water vapour at the point of combustion. The water may be provided in the form of liquid water injected into the flame, or water vapour in the form of steam injected into the flame. Where the water is liquid it forms steam on contact with the flame.

The actual presence of water vapour in the combustion chamber increases the volume and thermal mass of the gases in the combustion zone. This results in a reduction in the level of NOx in the combustion gases. However, the injection of water or water vapour at the point of combustion causes heat to be extracted from the flame and unfortunately it is not possible to recover this heat from the subsequent waste gas. Consequently the overall efficiency of the process is reduced.

It is an object of the present invention to provide a technique whereby the presence of the oxides of nitrogen in the exhaust gas leaving a regenerator are limited with an accompanying smaller reduction in overall process efficiency than is obtained with the methods described above.

It is also an object of the present invention to provide a regenerator adapted for this purpose and as a consequence also adapted for the removal from the heat storage bed of the regenerator of susceptible material tending to block the pores of the bed.

According to one aspect of the present invention we provide a method for limiting the presence of the oxides of nitrogen in the exhaust gas leaving a regenerator, the method comprising injecting water or water vapour into the regenerator during its firing phase and causing the water or water vapour to reach the combustion chamber of the regenerator by way of its heat storage bed which has been preheated during a previous heat collecting phase.

According to another aspect of the present invention we provide a regenerator adapted to limit the presence of the oxides of nitrogen in the exhaust gas leaving the regenerator, the regenerator comprising a shaft housing a heat storage bed, and means for injecting water or water vapour into the regenerator during firing in such a manner that the water or water vapour enters the combustion chamber of the regenerator by way of the heat storage bed which, in use, has been preheated during a previous heat collecting phase.

At the normal temperatures to which the heat storage bed of a regenerator is preheated, e.g. 1200° C., water (if injected rather than water vapour) will vapourise on passing through the bed and the resulting vapour will also be preheated before it enters the combustion chamber. In the case where vapour e.g. steam, is injected rather than water the vapour will simply be preheated on passing through the bed and will then enter the combustion chamber.

Since by either method water vapour is present in the combustion chamber of the regenerator during combustion, the volume and thermal mass of the combustion gases will be increased and this will result in the level of NOx in the gases being limited. However, since the water vapour has already been preheated by the heat storage bed and a large proportion of this heat will be collected as the water vapour leaves the system by way of another regenerator bed, little additional heat input is necessary to raise the temperature of this water vapour to process temperature. Consequently the overall efficiency of the process is not unduly reduced.

While the heat storage bed is cooled as the water especially or the water vapour passes through it we have surprisingly found that this has only a marginal effect in reducing the overall process efficiency.

We recommend that water rather than steam be injected if the steam has to be generated in a special plant since we have found that it is more efficient to generate the steam within the regenerator as a result of heat released from the bed rather than as a separate operation in say a steam-raising boiler. However, where the steam is available free, so to speak, as a waste product of a parallel process we would recommend injecting this steam rather than water in order to save the heat released from the bed in vapourising the water.

Preferably the water or water vapour is injected into the combustion air at a point upstream of the heat storage bed with respect to the direction of movement of the combustion air and the heat storage bed is arranged so that its surface farthest from the combustion chamber is uppermost. This will be the coldest part of the bed at all times and will thus ensure that heat removal from the bed will not reduce the peak air preheat temperature below the level which is a natural consequence of heat removal in the colder zones of the bed.

In a preferred embodiment of the invention during a firing phase of the regenerator the temperature of the preheated combustion air is sensed by temperature sensing means before the preheated air reaches the combustion chamber of the regenerator and if the temperature of the combustion air is below a preset level the injection of water or water vapour into the regenerator is ceased.

The value of this threshold temperature will be determined by the level of $NO_x$ in the exhaust gas permitted by the country in which the regenerative system is operating it being appreciated that the higher the temperature of the combustion air, the higher the flame temperature and therefore the higher the levels of $NO_x$ in the exhaust gas. As will also be appreciated, from the user's point of view it is generally desirable to operate with a flame temperature as high as possible to increase the heating efficiency of the process.

By monitoring the temperature of the preheated combustion air it is possible to maintain the flame temperature at no lower a level than is necessary to satisfy the legislation on permitted $NO_x$ levels.

According to a futher aspect of the present invention we provide a regenerator comprising a shaft housing a heat storage bed which, in use, is generally upwardly directed, means for injecting water or water vapour onto that surface of the heat storage bed which is uppermost when the shaft is in its generally upwardly directed position, an inlet for supplying water or water vapour to the injecting means, and an outlet for discharging from the regenerator water or water vapour which has percolated through the bed, the outlet being disposed beneath that surface of the bed which is lowermost when the shaft is in its generally upwardly directed position.

This regenerator, apart from enabling the level of $NO_x$ in the exhaust gas to be reduced, is also adapted for the removal from the heat storage bed of the regenerator "susceptible" material tending to block the pores of the bed. By "susceptible" material we mean material which is either water soluble or if not soluble is capable of being carried along by water, e.g. small or at any rate light particulate material. Such material is carried over by the waste gas from the furnace and deposits in the pores in the regenerator bed. Such material may be fluxes, and dust from the charge being heated, e.g. metal or glass dust. In use, water or vapour sprayed onto the uppermost surface of the bed when the regenerator is not in operation would percolate down through the bed dissolving any water soluble matter or washing away any light particulate matter, this matter and the transporting water being discharged through the outlet. This avoids the necessity to remove the bed to clean the particles and in fact promotes the useful life of the bed.

Preferably the inlet has a valve controlling the supply of water or vapour from the inlet to the injecting means and means are provided to control the valve such that the valve is open during a firing phase of the regenerator if the temperature of the combustion air sensed after preheat is above a preset level.

Suitably the means for controlling the inlet valve is also adapted to open the valve when the regenerator is neither firing nor collecting heat.

Conveniently the outlet has a valve controlling the discharge of water or vapour from the outlet and means are provided to control the valve such that the valve is closed during a firing or heat collecting phase and can be opened if the regenerator is neither firing nor collecting heat.

Figure 2:
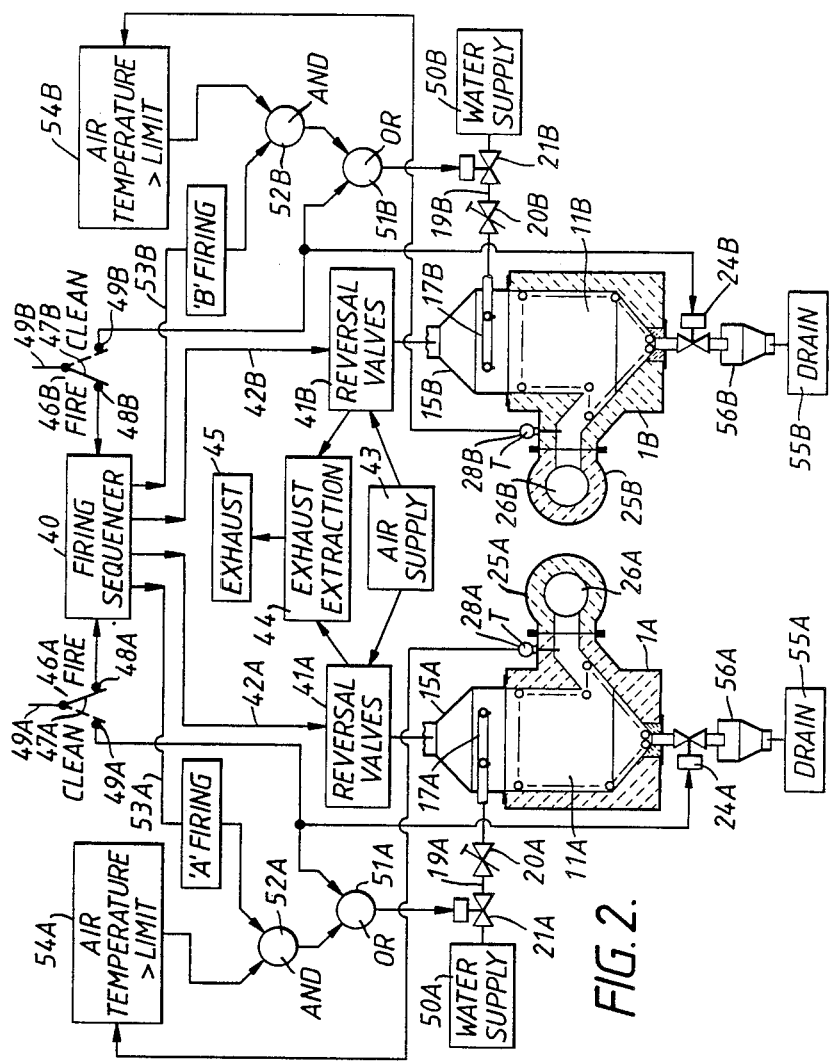

An embodiment of the invention will now be particularly described with reference to the accompanying drawings in which:

FIG. 1 is a vertical section through a regenerator adapted both to produce reduced levels of $NO_x$ and for the removal of susceptible material from the heat storage bed of the regenerator and FIG. 2 is a schematic diagram of a suitable control system for a regenerative heating system comprising two regenerators of the type shown in FIG. 1.

Referring to FIG. 1, the regenerator 1 comprises a shaft 2 constructed of a refractory material and having a main portion 3 and a side portion 4 the main portion 3 defining a generally vertically directed main bore 5 and the side portion 4 defining a bore 6.

The main bore 5 has an uppermost cylindrical portion 7 which leads to a lowermost downwardly tapering frusto-conical portion 8.

The side bore 6 has an upwardly angled cylindrical portion 9 leading from the lowermost region of the portion 7 and a generally horizontal portion 10 leading from the portion 9.

The main bore 5 and the angled portion 9 of the side bore 6 house the heat storage bed 11 which serves as means for collecting heat from waste gas during the heat collecting phase of the regenerator 1 and as means for preheating combustion air during the firing phase of the regenerator 1. The bed 11 may comprise a multiplicity of refractory particles, in this case balls 12 of known type which almost completely fill the main bore 5 and partially occupy the bore portion 9. Secured by a flange 13 to the shaft 1 at a point above the uppermost surface 14 of the bed is a hood 15 through which during a firing phase combustion air is supplied to enter the main bore 3 for preheating by the heat storage bed 11 and through which during a heat collecting cycle waste gas passes in the opposite direction after leaving the main bore 3 having given up its waste heat to the bed 11.

The hood 15 has a cylindrical wall 16 adjacent to the flange 13 and a pipe 17 extends horizontally through the wall 16 across the uppermost surface 14 The pipe 17 is provided with a number of spray nozzles facing the uppermost surface 14 of the bed 11. These nozzles 18 serve to spray water onto the uppermost surface 14 of the bed 11 when the pipe 17 is supplied with water from an inlet 19. It will be appreciated that the inlet 19 could alternatively be supplied with steam for discharge from the nozzles 18 in the event that waste steam is available.

The inlet 19 is provided with an adjustable regulator valve 20 for regulating the flow rate of water to the pipe 17 and a solenoid type open-close valve 21 controlling the supply of water to the pipe according to a regime to be described subsequently.

The base of the shaft 1 is apertured centrally and a refractory insert 22 is located within the aperture. The insert 22 is also apertured centrally to receive a downwardly extending outlet pipe 23 for any water which has percolated through the heat storage bed 11. The outlet pipe 23 is provided with an open-close type solenoid valve 24 which is controlled according to a regime to be described subsequently.

A refractory burner 25 of known type is secured to the side portion 4 of the shaft 2 and defines a cylindrical combustion chamber 26 which via a lateral bore 27 communicates with the side bore. While not shown the burner 25 is as conventional provided with a fuel inlet for injecting fuel into the combustion chamber 26 for combustion with preheated combustion air leaving the heat storage bed 11 and entering the side bore 6. While also not shown the burner is as conventional provided with an ignition device such as a pilot burner to ignite fuel entering the combustion chamber 26.

In use, the burner 25 is secured to the wall of a furnace (not shown) so as to provide during a firing phase combustion products for heating the charge within the furnace. During a heat collecting phase the burner serves an inlet for the regenerator 1 to receive from the furnace, waste gas to provide waste heat for storage in the heat storage bed 11.

A temperature sensing device 28 extends through the wall of the side portion 4 into the side bore portion 10 to sense the temperature of the preheated combustion air during a heat collecting phase before the preheated air enters the combustion chamber 26 for the purpose already described above.

Referring to FIG. 2, similar compontents to those shown in FIG. 1 bear the same reference numerals except that those components forming part of or controlling one regenerator have a suffix "A" after the respective number while those components forming part of or controlling the other regenerator have a suffix "B" after the respective number.

The regenerative heating system shown operates in a conventional manner, the operation of the two regenerators 1A and B being controlled by a firing sequencer 40 of known type such that when 1A is firing, regenerator 1B is collecting heat and when regenerator 1B is firing regenerator 1A is collecting heat.

During operation, the regenerators alternate between the firing and heat collecting phases, changeover, from one phase to the other being time or temperature controlled as is conventional.

Each regenerator 1 is provided with a reversal valve 41A, 41B also of known type, each valve 41 being operable on a command signal from the firing sequencer 40 on appropriate lines 42A, 42B to connect the hood 15A, 15B of the regenerator 1, 1B either to a combustion air supply 43 during a firing phase or to an exhaust extractor 44 connected to an exhaust duct 44 during a heat collecting phase. As will be appreciated when valve 41A is connecting its hood 15A to the air supply 43, valve 41B is connecting its hood 15B to the exhaust extractor 44 and when valve 41A is connecting its hood 15A to the exhaust extractor 44 valve 41B is connecting its hood 15B to the air supply 43.

While not shown, the firing sequencer 40 also controls the injection of fuel into the burner 25A, 25B of each regenerator 1 in the well known manner such that fuel is injected into the burner 25 only when the particular regenerator 1 is firing for mixture and combustion with the preheated combustion air.

The firing sequencer 40 is activated by two switches 46A, 46B, each regenerator 1A and 1B being provided with a switch 46. To activate the firing sequencer 40 so as to operate the regenerative heating system, each of the switch members 47A, 47B must be moved to engage the respective "FIRE" position contacts 48A, 48B so as to enable the firing sequencer 40 to be powered up by the power lines 49A, 49B.

To shut down the system, each of the switch members 47A 47B must be moved to engage the respective "CLEAN" position contact 49A, 49B. In this position, the heat storage bed 11A, 11B of each regenerator 1 can be cleaned by the removal of susceptible material with water.

Each of the water inlets 19A, 19B is supplied with water from a respective water supply 50A, 50B under the control of the respective water inlet solenoid valves 21A and 21B and regulator valves 20A and 20B.

The solenoid valves 21A, 21B are controlled by respective OR gates 51A, 51B such that the valves 21A, 21B are closed unless the respective OR gate 51A, 51B is enabled in which case, the valves 21A, 21B are opened.

The OR gates 51A and 51B are enabled if the respective switch member 47A, 47B is engaging its "CLEAN" position contact 49A, 49B OR if an appropriate AND gate 52A, 52B is enabled.

Each AND gate 52A, 52B is enabled if there is a signal on a respective line 53A, 53B from the firing sequencer 40 requiring the regenerator 1A, 1B to fire AND if the temperature of the combustion air in that regenerator as sensed by the appropriate temperature sensor 27A, 27B is still above its preset level or limit. In the case of the latter, the temperature sensed is compared with a temperature preset in a comparitor 54A, 54B and only if the temperature is still above the preset level will an enabling signal reach the AND gate 52A, 52B.

The water outlet solenoid valves 24A, 24B are always closed unless the respective switch member 47A, 47B is engaging its "CLEAN" position contact 49A, 49B in which case the valve 47A, 47B will open to allow water to discharge through the outlet 23A, 23B to a drain 55A, 55B by way of a drain duct 56A, 56B.

If the regenerative heating system is operating to provide heat for a furnace charge, each of the switch members 47A, 47B will be engaging its respective "FIRE" position contact 48A, 48B and the firing sequencer 40 will be activated. In this case the sequencer 40 will have selected one of the regenerators to fire and the other to collect heat. Thus in the regenerator which is firing the combustion air will be preheated by the previously heated heat storage bed 11. If the temperature of this air as sensed by sensor 28 is above the preset limit, the AND gate 52 will be enabled to enable the OR gate 51 and thus the water inlet solenoid valve 21 will open. Thus water will be supplied to the pipe 17 and will be sprayed by the nozzles 18 onto the uppermost surface 14 of the bed 11. This water will be converted to steam at the level in the bed where the temperature of the bed 11 is high enough. Under normal circumstances the temperature in this part of the bed 11 will be 200° C. or more so that vapourisation of the water will occur instantaneously. This vapour will be entrained by and will be carried along by the stream of combustion air as it passes through the bed 11 for preheating. The vapour in the combustion air will tend to reduce the level of $NO_x$ resulting from the combustion of fuel and the preheated air in the combustion chamber 26 of the burner 25. The resulting combustion products will enter the furnace to heat the charge contained therein. The resultant waste gas will then enter the other regenerator so as to preheat its cooled heat storage bed for its next firing phase. This process will continue until the temperature of the preheated combustion air in that regenerator which is firing falls to below its preset level in which case the AND gate 52 will be disenabled and consequently the solenoid valve 21 will close to terminate water spraying. In any case, at the end of the firing phase even if water is still being supplied to the regenerator which is firing, the AND gate 52 will be disenabled on changeover to the heat collecting cycle. This process will continue during that period when the system is operating.

When the system has been shut down for cleaning, the switch members 47 will be engaging their respective "CLEAN" position contacts 49. In this case therefore the respective OR gates 51 will be enabled to open the water inlet solenoid valves 21 to enable water to be sprayed onto the heat storage beds 11 for cleaning purposes. In addition the outlet valves 24 will also be open to discharge the water from the regenerators 1. This water, which will percolate throught the heat storage beds 11 will contain water soluble and light particulate matter carried over from the furnace charge and tending to block the pores of the beds 11 - thus providing cleaning of the bed.

I claim:

1. A method for limiting the amount of nitrogen oxides in exhaust gas from a regenerator by causing water vapor to enter a combustion chamber of the regenerator during a firing phase in a form in which the water vapor is entrained in preheated combustion air, which comprises:
   (a) causing the water or water vapor to reach the combustion chamber by way of a preheated heat storage bed by injecting water or water vapor into the combustion air at a point upstream of the bed with respect to the direction of movement of the combustion air,
   (b) sensing the temperature of the combustion air after the combustion air leaves the heat storage bed but before the combustion air enters the combustion chamber, and
   (c) controlling the injection of water or water vapor into the regenerator in such a way that the water or water vapor is injected when the temperature sensed is above a preset level and ceases to be injected when the temperature sensed is below a preset level.

2. A regenerator adopted to limit the amount of nitrogen oxides in exhaust gas therefrom by causing water vapor to enter a combustion chamber of the regenerator during a firing phase in a form in which the water vapor is entrained in preheated combustion air, the regenerator comprising a shaft housing a heat storage bed, means for injecting water or water vapor into the combustion air at a point upstream of the heat storage bed with respect to the direction of movement of the combustion air so that the water or water vapor reaches the combustion chamber by way of the heat storage bed, and wherein means are provided to sense the temperature of the combustion air before it reaches the combustion chamber and for controlling the water or water vapor injection means such that water or water vapor is injected when the temperature sensed is above a preset level and ceases to be injected when the temperature sensed is below a preset level.

3. The regenerator as claimed in claim 2, wherein the storage bed has an uppermost surface and a lowermost surface, the means for injecting water or water vapor is arranged to inject the water onto the uppermost surface of the bed, an inlet is provided for supplying water or water vapor to the injecting means and an outlet is provided for discharging from the regenerator water which has percolated through the bed, the outlet being disposed between the lowermost surface of the bed.

4. The regenerator as claimed in claim 3, wherein the inlet has a valve for controlling the supply of water or water vapor from the inlet to the injecting means, and said valve is provided with control means such that the valve is open during a firing cycle of the regenerator, when the temperature of the combustion air sensed after preheating is above a preset level but is closed when the temperature of the combustion air sensed after preheating is below the preset level.

5. The regenerator as claimed in claim 2, wherein the means for controlling the inlet valve is also adapted to open the valve when the regenerator is neither firing nor collecting heat.

6. The regenerator as claimed in claim 2, wherein the outlet has a valve controlling the discharge of water or water vapor from the outlet and said valve is provided with a control means such that the valve is closed during firing or heat collecting phases and is capable of being opened when the regenerator is neither firing nor collecting heat.

7. A regenerator comprising:
  (a) a shaft which houses a heat storage bed which, has an uppermost surface and a lowermost surface,
  (b) means for injecting water or water vapor onto the uppermost surface of the heat storage bed,
  (c) an inlet for supplying water or water vapor to the injecting means,
  (d) an outlet for discharging from the regenerator water which has percolated through the bed, the outlet being disposed beneath the lowermost surface of the bed, and
  (e) a valve in the outlet for controlling the discharge of water or water vapor from the outlet, said valve being provided with a control means such that the valve is closed during the firing or heat collecting phases and is capable of being opened when the regenerator is neither firing nor collecting heat.

* * * * *